United States Patent [19]

Hoppe

[11] Patent Number: 4,947,287

[45] Date of Patent: Aug. 7, 1990

[54] CAPACITOR COOLING ARRANGEMENT

[75] Inventor: Richard J. Hoppe, Rockford, Ill.

[73] Assignee: Sundstrand Corporation, Rockford, Ill.

[21] Appl. No.: 277,945

[22] Filed: Nov. 30, 1988

[51] Int. Cl.$^5$ .......................... H01G 4/10; H05K 7/20
[52] U.S. Cl. ...................................... 361/321; 361/381
[58] Field of Search ................................ 361/380–385, 361/321; 357/81, 82, 83

[56] References Cited

U.S. PATENT DOCUMENTS

| | | | |
|---|---|---|---|
| 1,474,486 | 11/1923 | MacPherson | 361/328 X |
| 1,713,867 | 5/1929 | Dubilier | 361/330 X |
| 3,184,649 | 5/1965 | Singletary | 361/381 X |
| 3,416,597 | 12/1968 | Kupferberg | 357/82 X |
| 3,840,787 | 10/1974 | Grahame | 361/275 X |
| 4,449,578 | 5/1984 | Munekawa | 361/385 X |
| 4,504,850 | 3/1985 | Pollard et al. | 357/81 X |
| 4,746,557 | 5/1988 | Sakamoto et al. | 361/321 X |

FOREIGN PATENT DOCUMENTS 3609037 10/1986 Fed. Rep. of Germany ...... 361/381

OTHER PUBLICATIONS

I.B.M. Technical Disclosure Bulletin May 1977, vol. 19 No. 12 pp. 4690 357–81.
"Capacitors" Article–*Scienfitic American* Magazine, Jul. 1988 issue, pp. 86–90B.

*Primary Examiner*—Donald A. Griffin
*Attorney, Agent, or Firm*—Antonelli, Terry, Stout & Kraus

[57] ABSTRACT

A cooling arrangement is provided for capacitor chips (10) or a capacitor assembly (40). A metal foil (18,18',18",18''') is affixed to a chip (10) with electrical insulation therebetween. The foil (18,18',18",18''') has a free end extending beyond the capacitor periphery and transversely of the capacitor stack (13) and can be provided with an L-shaped end (21) or a tube heat exchanger (23) or a fin plate heat exchanger (24). An assembly (40) of capacitors (30 to 38) can be arranged between legs of U-shaped metal heat exchange members (25,26,27) which conduct heat from the capacitors (30 to 38) through the legs and to a coolplate (28) having a tube (29) for passage of coolant.

19 Claims, 3 Drawing Sheets

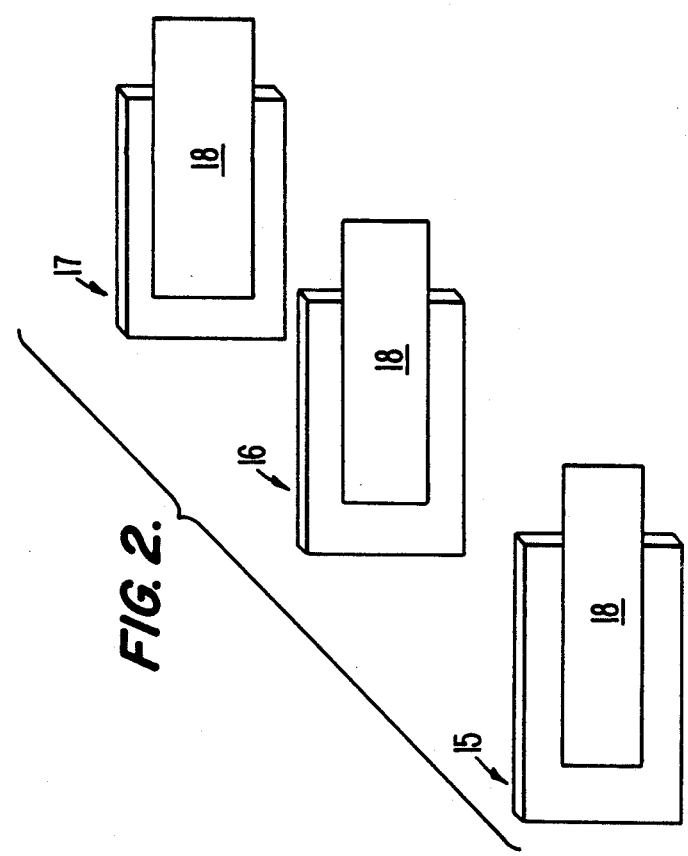
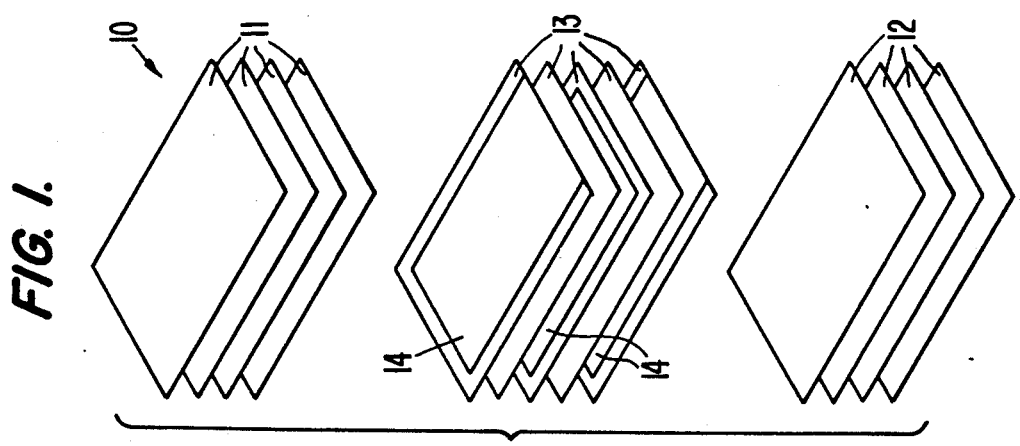

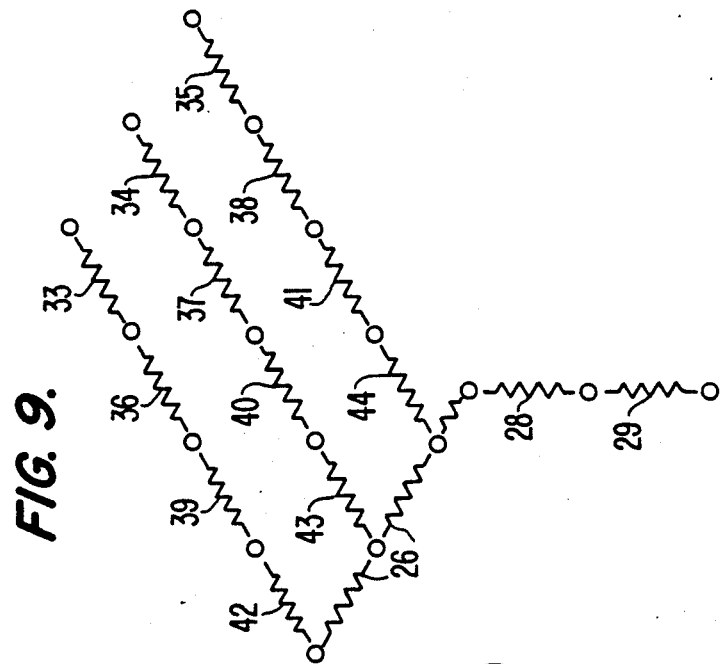
FIG. 9.
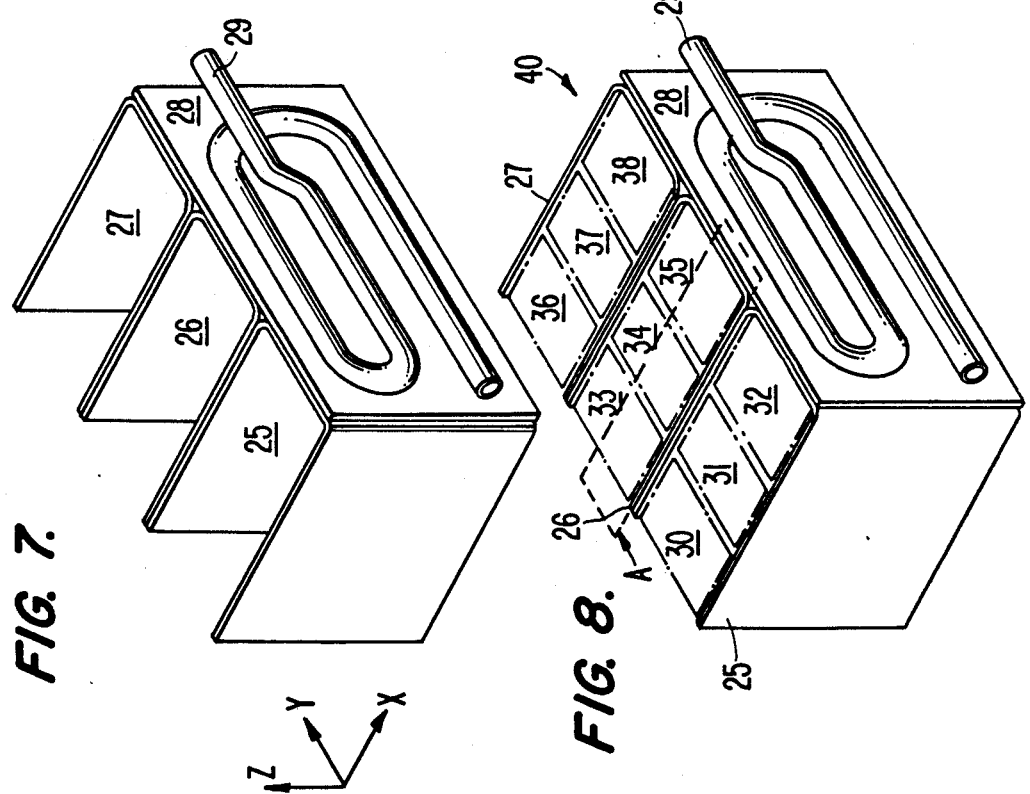
FIG. 7.
FIG. 8.

CAPACITOR COOLING ARRANGEMENT

TECHNICAL FIELD

The present invention relates to high power density multi-layer ceramic capacitor (MLC) and, more particularly, to a cooling arrangement for such capacitors which permits a greater use of their unique features while overcoming the problem of cooling which otherwise limits their use as, for example, output filters.

BACKGROUND ART

The efficiency of a capacitor is measured by its dielectric constant. Although capacitor design has been in existence for several hundred years with the invention of the Leyden jar, miniaturization of modern electronics has put increasingly greater demands on the improvement of capacitor design because capacitors protect integrated circuits from spurious electrical signals and damp out surges that would otherwise damage the circuits or disrupt their operation.

Because of the nature of ceramic material, the behavior of the electrons in that material offers increased capacitance and efficiency when used as an insulating material. Even though the electrons in the insulator are not mobile, they can shift slightly under the influence of the attractive and repulsive forces from the electrodes on each side. Electrons on one side of the insulator bulge out from the surface creating a negative charge while on the other side they retreat from the surface giving rise to a positive charge. The charges thus generated on the insulator help to neutralize the charges on the electrodes. Some insulators can bear charges that are nearly as large as those on the electrodes themselves. Such neutralization reduces repulsive forces and allows more charge to reside on the electrodes which in turn increases capacitance which is reflected in the dielectric constant. It is this property which accounts for the efficacy of the multi-layer ceramic capacitor.

In multi-layer ceramic capacitors (MLC's) ceramics generally consisting of barium titanate with small amounts of other oxides are generally used as the insulator. The ceramics have dielectric constants of between 2000 and 6000 and are in the form of fine powders that have particles a few micrometers in diameter. The particles are dispersed in a solvent resulting in a slurry with the consistency of paint. The slurry is then cast in thin sheets onto a paper or stainless steel belt with the sheet thickness controlled by a blade. The slurry dries as the solvent evaporates leaving a smooth unfired or green tape which is cut into squares from 6 to 8 inches square. Thousands of electrodes are printed on each sheet through a thin screen that delineates the electrode pattern. The general structure and assembly of such a capacitor is described in the July 1988 issue of *Scientific American* at page 86 *et seq*.

MLC's are very sensitive to temperature, as a result of which there is the problem of capacitance drift. Another limitation of the MLC is its operating temperature limit. That limit is 125° C. to 150° C. which can be a severe limitation in certain aerospace applications. Consequently, to be able to obtain the advantages of using the MLC, removal of the heat created by capacitor losses so as to keep the temperature and thermal shock within operating range is a critical factor for circuit design. However, it is also undesirable to overcool the capacitor because this will increase the heat losses due to the inverse relationship between temperature and heat loss.

In the past, it has been proposed to dissipate heat within a capacitor in several ways. For instance, U.S. Pat. No. 1,474,486 discloses a capacitor having particular application for transmitters and radio communications in which metal foil conductors and mica insulators are successively joined in a stack. Each pair of adjacent sections comprising a plurality of alternately disposed mica and foil sheets are separated from each other by two insulating sheets which on one side may be of mica and on opposite sides of a conductor sheet which conducts both electricity and heat. Although this arrangement is designed to promote heat radiation, it is not directed to the particular construction of MCL's and, more importantly, to the properties of MCL's which require a higher efficiency cooling arrangement.

U.S. Pat. No. 1,713,867 shows a similar arrangement in which end blocks of metal are placed against a section of mica sheets which serves to strengthen the sheet and radiate heat from the section. However, the metal end blocks are contained within the periphery of the mica sheets and would not be satisfactory for conducting capacitance losses generated by MCL's.

U.S. Pat. No. 3,840,780, relates to a wound capacitor comprising alternate strips of paper and electrode foil. A resistor strip is placed near the end of the capacitor roll section for controlled dissipation of any undesirable voltage existing between the capacitor terminals and also, to some extent, to dissipate heat within the capacitor. Again, however, such an arrangement would not be satisfactory to keep an MCL within its operating limit of 125° C. in circuits used for certain applications such as high speed switch mode power supplies which require extremely low equivalent series resistance and equivalent-series inductance capacitors for output filtering.

SUMMARY OF THE INVENTION

It is therefore an object of the present invention to overcome the problems and disadvantages encountered in prior art arrangements for cooling capacitors.

It is a further object of the present invention to provide a simple and reliable cooling arrangement for a ceramic capacitor which assures effective cooling and maintenance of operating temperature and thermal shock limits.

It is yet a further object of the present invention to provide a simple yet effective cooling arrangement which permits enhanced surface area for the MLC's The foregoing objects have been achieved by the use of aluminum or copper foil between ceramic plates so that the heat generated by the ceramic plates can travel through the foil to an exposed end outside the boundaries of the capacitors where the foil is subjected to heat transfer by interaction with another cooling medium such as blowing air for direct air cooling or by brazing the foil ends to a liquid or air cooled heat exchanger so that the ceramic plates are uniformly cooled.

In another form of the present invention, several capacitor subassemblies are arranged so as to conduct heat to U-shaped fins which are brazed or otherwise joined to a coolplate. Such an arrangement shortens the conduction distances, provides sufficiently large surface areas for heat transfer, orients the individual chip subassemblies in the direction of thermal conductivity, and minimizes conduction across electrical and thermal insulating layers.

BRIEF DESCRIPTION OF THE DRAWINGS

These and further features, objects and advantages of the present invention will become more apparent from the following detailed description of the present invention when taken in conjunction with the accompanying drawings wherein:

FIG. 1 is an exploded view of a conventional MLC construction showing the ceramic layers and metal;

FIG. 2 is an exploded view of an MLC chip subassembly constructed with the foil member in accordance with the present invention;

FIG. 7 is another embodiment of a heat exchanger assembly used for an assembly of several MLC chip subassemblies;

FIG. 8 is a view similar to FIG. 7 but with the subassemblies of MLC's assembled therein; and FIG. 9 is a thermal network of a section of the capacitor assembly shown in FIG. 8.

BEST MODE FOR CARRYING OUT THE INVENTION

Figure 3:
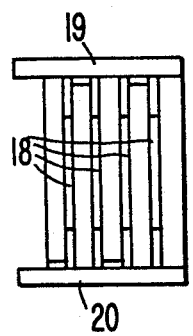
FIG. 3 is a side view of the assembled MLC chip subassembly in accordance with the present invention.

Referring now to the drawings and, in particular, to FIG. 1, an MLC chip subassembly is designated generally by the numeral 10. It consists basically of four blank ceramic layers 11,12 on opposed sides of sixty-three ceramic layers 13, only five of which are shown in FIG. 1. Of course, the number of layers is variable depending upon the particular capacitors.

The four blank layers 11,12 on each side as well as the sixty-three layers 13 therebetween are comprised of an appropriate ceramic material such as barium titanate. Every other layer of the sixty-three layers 13 has electrodes 14. In the illustrated embodiment, there are a total of thirty-three electrodes, sixteen on one side and seventeen on the other side of every other ceramic layer 13. It will be appreciated that many more such layers can be used depending upon the desired design characteristics of the MLC. Furthermore, the layers 13 can be slightly staggered as viewed in the vertical direction shown in FIG. 1 so that an edge on one side of every other layer 13 can be electrically joined to a terminal and an opposite edge on the other side of alternating layers 13 can be electrically joined to another terminal to form an MLC.

Typically, the ceramic layers will have a thickness of 0.015 inch and the electrodes will have a thickness of 0.0015 inch. In terms of thermal conductivity, terminals (not shown in FIG. 1) which are connected to the assembled MLC 10 will have approximately 90 times higher conductivity than the conductivity of the ceramic and over twice the conductivity of the electrodes. For example, the ceramic can have a thermal conductivity of 2.6 btu/hr-ft-° F. whereas that of the electrode will be 80.1 and that of the terminal will be 220.0. The abovedescribed MLC without some means for cooling experiences the problems regarding temperature limits discussed in the section "Background Art" above.

FIG. 2 shows one embodiment of the present invention which has solved the problem of making sure that temperature limits and thermal shock specifications of an MLC are not exceeded. For simplicity of construction, the electrodes are again not shown because they form no part of the invention. Only a stack of ceramic layers designated generally by the numerals 15,16,17 which are assembled together is shown. Each layer in the stack is approximately 0.10 inch thick. On one end face of each layer 15,16,17 is provided a metal foil made, for example, of aluminum or copper 18 because of their excellent heat conduction properties. The foil 18 can have a thickness of 0.01 to 0.02 inch and be attached by adhesive to the ceramic layer 15,16,17 which is coated with an insulating material by potting or the like.

Unlike foils used in other types of capacitors in the past, the foils 18 of the present invention are perpendicular to the assembled stack of capacitor layers 15,16,17 and project outwardly beyond the periphery of the capacitor layers so that the projecting free ends of the foils 18 can be in heat exchange contact with air or another cooling fluid. Furthermore, the thermal conductor foils 18 are thus electrically insulated from the electrically conductive portions of the capacitor layers.

FIG. 3 is a side view of a portion of the assembled capacitor of FIG. 2 with terminals for electrical connection to alternating layers designated by the numerals 19,20.

Figure 4:
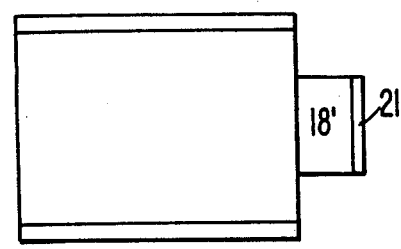
FIG. 4, is an end view of an MLC constructed in accordance with another embodiment of the present invention.
Figure 4A:
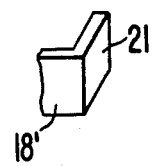
FIG. 4A is a partial perspective view of the capacitor heat exchanger shown in FIG. 4.

FIG. 4 and 4A show another embodiment similar to FIG. 2 but having a metal foil heat exchanger 18' with an outer end 21 bent at right angles in the form of an L (FIG. 4A) which projects into the plane of the paper as shown in FIG. 4 to facilitate or enhance heat transfer.

Figure 5:
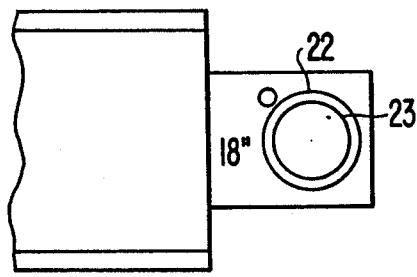
FIG. 5 is an end view of another embodiment of the MLC constructed in accordance with the present invention.

FIG. 5 shows another embodiment of the capacitor cooling arrangement in accordance with the present invention wherein metal foil members 18" are provided with an aperture 22 at their outer free end which extends beyond the capacitor plate so as to receive therethrough a tube heat exchanger 23 therein for carrying a liquid or gas which removes the heat from the foil 18".

Figure 6:
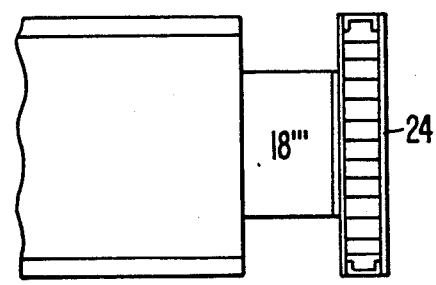
FIG. 6 is yet another embodiment of an MLC constructed in accordance with the present invention.

FIG. 6 shows yet another embodiment of the cooling arrangement in which a lanced offset fin plate heat exchanger 24 is joined at the end of each metal foil piece 18''' protruding from the capacitor plates. Air or other fluid is forced through lanced offset fin stock, or any other appropriate fin stock, of a known type which is arranged in a plate heat exchanger for maximizing heat exchange between the foil and the cooling fluid. It should be noted that in all the embodiments described above and shown in FIGS. 2-6 the capacitor elements are stacked in planes which are perpendicular to the thermally conductive metal foil strips 18,18',18",18'''. This arrangement allows the thermal conductor strips to be electrically insulated from the electrically conductive portions of the capacitor as shown in U.S. Pat. No. 1,713,867. Moreover, unlike the arrangement shown in U.S. Pat. No. 1,474,486, the present invention extends the thermally conductive member outwardly from between insulated portions of a capacitor.

FIGS. 7 and 8 show another form of heat exchanger assembly for multiple capacitors. In FIG. 7, U-shaped heat exchange metal members are assembled together by brazing or the like and are joined at their bight portions to a cool plate 28 in which is incorporated a three-pass coolant passage 29 for passing a coolant fluid therethrough. The legs of the U-shaped members 25,26,27 define fins and the bight of each of the members 25,26,27 forms the fin base which is attached to the cool plate 28. The arrangement designated by the numeral 40 in FIG. 8 shows three MLC chip subassemblies 30,31, and 32 between the fins of member 25, three MLC's 33,34,35 between the fins of member 26, and three MLC elements 36,37,38 between the fins of member 27. Insulation in the form of KAPTON or similar material is provided in a known manner on each of the MLC's which are provided with copper electrodes also in a known manner. The entire assembly, i.e. the heat exchanger and capacitors, are then vacuum potted in a commercially available potting material such as "Black Beauty" to eliminate air pockets and provide conduction paths to the heat exchanger.

The arrangement shown in FIG. 8 is particularly useful as an output filter capacitor. Active cooling is effected by exhaust fluid from an inductor assembly. For design purposes, it is assumed that the worst case temperature of the exhaust fluid is no higher than 68° C. With such a heat exchanger, the heat losses for the nine capacitors will be relatively small. The capacitors furthest from the heat exchanger will have the smallest heat losses and the highest temperatures inasmuch as the temperature of the ceramic is a function of the conduction distance from the heat generating source to the heat exchanger fluid. Therefore, the capacitors closest to the heat exchanger will be cooler than those which are more remote from the heat exchanger.

A thermal network of the section in dotted lines designated by the letter A in FIG. 8 is shown in FIG. 9. Only this section need be analyzed because of the symmetry of the system in the X and Y directions using the coordinate system shown in FIG. 7. This network is intended to be merely illustrative and shows a heat path through the capacitor elements 33,34,35 then through the copper electrodes 36,37,38, through the Kapton insulation 39,40,41 then through the "Black Beauty" epoxy potting material 42, to the leg of fin 26, then to the tube wall 28 and finally to the fluid in the tube 29 brazed to the tube wall 28. In a typical installation, the temperature of capacitor element 33 will be 95° C., while that of capacitor element 34 is 92° C. and that of capacitor element 35 is 85° C. To maintain that thermal relationship, the fluid in the tube 29 is maintained at no higher than 68° C. to maintain the above temperatures in the capacitor elements.

While several embodiments in accordance with the present invention have been shown and described, it should be clearly understood that the same is susceptible of numerous changes and modifications which will be apparent to one skilled in this art given the above disclosure. Therefore, it is not intended that the present invention be limited to the details shown and described herein but that it cover all such changes and modifications as are encompassed by the scope of the appended claims.

I claim:

1. A multilayer ceramic capacitor, comprising a plurality of ceramic capacitor plates, each having a circumference, and means operatively arranged between opposing plates of the plurality of capacitor plates so as to be electrically insulated from the plates and extending in a direction perpendicular to a direction defined by stacking of the plurality capacitor plates for conducting heat from the capacitor plates, wherein the heat conducting means extend beyond only a portion of the circumference of each of the capacitor plates to effect heat transfer from inside the capacitor to outside the capacitor.

2. A multilayer ceramic capacitor according to claim 1, wherein the heat conducting means is a metal member joined to a respective capacitor plate with electrical insulation therebetween.

3. A multilayer ceramic capacitor according to claim 1, wherein the heat conducting means is a foil member joined to a respective capacitor plate with electrical insulation therebetween.

4. A multilayer ceramic capacitor according to claim 1, wherein the portion of the heat conducting means includes means for enhancing heat transfer.

5. A multilayer ceramic capacitor according to claim 4, wherein the enhancing means comprises an L-shaped fin at the free end of the portion.

6. A multilayer ceramic capacitor according to claim 5, wherein the heat conducting means is a metal member joined to a respective capacitor plate with electrical insulation therebetween.

7. A multilayer ceramic capacitor according to claim 5, wherein the heat conducting means is a foil member joined to a respective capacitor plate with electrical insulation therebetween.

8. A multilayer ceramic capacitor according to claim 4, wherein the enhancing means comprises a fluid conducting tube passing through the portion.

9. A multilayer ceramic capacitor according to claim 8, wherein the heat conducting means is a metal member joined to a respective capacitor plate with electrical insulation therebetween.

10. A multilayer ceramic capacitor according to claim 4, wherein the enhancing means comprises a lanced offset fin plate heat exchanger at the end of the portion.

11. A multilayer ceramic capacitor according to claim 10, wherein the heat conducting means is a metal member joined to a respective capacitor plate with electrical insulation therebetween.

12. A multilayer ceramic capacitor according to claim 10, wherein the heat conducting means is a foil member joined to a respective capacitor plate with electrical insulation therebetween.

13. A multilayer ceramic capacitor assembly, comprising:
at least one U-shaped heat exchanger having a bight portion and upstanding legs which form heat conducting fins;
a plurality of capacitors having electrodes arranged within the at least one U-shaped heat exchanger such that a terminal path is defined between the capacitors and the legs with electrical insulation therebetween; and
means on the bight portion for exchanging heat transferred from the fins.

14. A multilayer ceramic capacitor according to claim 13, wherein the heat exchanging means is a coolplate.

15. A multilayer ceramic capacitor according to claim 14, wherein the coolplate has a passage associated therewith for conducting a coolant fluid therethrough.

16. A multilayer ceramic capacitor comprising:
at least one U-shaped heat exchanger having a bight portion and upstanding legs which form heat conducting fins;

a plurality of capacitors having electrodes arranged within the at least one U-shaped heat exchanger such that a terminal path is defined between the capacitors and the legs with electrical insulation therebetween; and means operatively associated with the bight portion for exchanging heat transferred from the fins, wherein a plurality of the at least one U-shaped heat exchangers is provided with their respective adjoining legs being connected and their respective bight portions being associated with the heat exchanging means.

17. A multilayer ceramic capacitor according to claim 16, wherein the assembly is potted with an epoxy resin which further constitutes a heat transfer path from the capacitors to the heat exchanging means.

18. A multilayer ceramic capacitor according to claim 17, wherein the heat exchanging means is a coolplate.

19. A multilayer ceramic capacitor according to claim 18, wherein the coolplate has a passage associated therewith for conducting a coolant fluid therethrough.

* * * * *